Dec. 25, 1934.　　　　G. SCHAPIRO　　　　1,985,462
METHOD OF AND MACHINE FOR PRODUCING BUNDLED SMALL WOOD
Filed Nov. 18, 1931　　　10 Sheets-Sheet 1

Dec. 25, 1934.  G. SCHAPIRO  1,985,462

METHOD OF AND MACHINE FOR PRODUCING BUNDLED SMALL WOOD

Filed Nov. 18, 1931  10 Sheets-Sheet 2

Dec. 25, 1934.   G. SCHAPIRO   1,985,462
METHOD OF AND MACHINE FOR PRODUCING BUNDLED SMALL WOOD
Filed Nov. 18, 1931   10 Sheets-Sheet 3

Dec. 25, 1934.   G. SCHAPIRO   1,985,462
METHOD OF AND MACHINE FOR PRODUCING BUNDLED SMALL WOOD
Filed Nov. 18, 1931   10 Sheets-Sheet 4

Dec. 25, 1934.  G. SCHAPIRO  1,985,462
METHOD OF AND MACHINE FOR PRODUCING BUNDLED SMALL WOOD
Filed Nov. 18, 1931  10 Sheets-Sheet 5

Dec. 25, 1934.   G. SCHAPIRO   1,985,462
METHOD OF AND MACHINE FOR PRODUCING BUNDLED SMALL WOOD
Filed Nov. 18, 1931   10 Sheets-Sheet 6

Inventor
Georg Schapiro
By B. Singer, Atty.

Dec. 25, 1934.   G. SCHAPIRO   1,985,462
METHOD OF AND MACHINE FOR PRODUCING BUNDLED SMALL WOOD
Filed Nov. 18, 1931   10 Sheets-Sheet 8

Dec. 25, 1934. G. SCHAPIRO 1,985,462
METHOD OF AND MACHINE FOR PRODUCING BUNDLED SMALL WOOD
Filed Nov. 18, 1931 10 Sheets-Sheet 9

Dec. 25, 1934.    G. SCHAPIRO    1,985,462
METHOD OF AND MACHINE FOR PRODUCING BUNDLED SMALL WOOD
Filed Nov. 18, 1931    10 Sheets-Sheet 10

Patented Dec. 25, 1934

1,985,462

UNITED STATES PATENT OFFICE 1,985,462

METHOD OF AND MACHINE FOR PRODUCING BUNDLED SMALL WOOD

Georg Schapiro, Berlin, Germany

Application November 18, 1931, Serial No. 575,943
In Germany November 21, 1930

18 Claims. (Cl. 144—192)

The usual method of producing bundles of small wood consists in this, that the billets are divided up in a splitting machine and the pieces or chips are thrown out, they are thereupon set in order by a further machine and then passed to hand presses or bundling machines, where they are tied up with wire into bundles.

The invention consists in this that in one machine the wood is split and the chips are conveyed in their relative positions in the form of a stream of wood on a conveyor directly after being split to a bundling device, where they are divided into bundles and tied. The advantage of this arrangement is that the whole operation of conversion from the billet to the finished bundle is effected in a far more rapid and labour saving manner than hitherto and that the whole machine plant is considerably cheaper and takes up far less space than hitherto.

Valuable details of the invention reside in the construction of the various parts of the plant with its conveying, gripping and binding means, as hereinafter described.

The accompanying drawings illustrate the invention with reference to a constructional example, Figs. 1 and 2 being a side elevation and a view from above, partly broken away, of the entire plant, Figs. 3 and 4 vertical sections through the bundling press at an angle to one another, Fig. 4 being a section taken on the line IV—IV of Fig. 5, Fig. 4ª an enlarged horizontal section of the binding device, Figs. 5 and 6 are views from above of the bundling press with various covering parts omitted, Fig. 6ª is a detail sectional view of the shears for cutting off the bunding wire and their cooperating elements.

A wood splitting device 1 driven by an electric motor comprises a conveyor 2 in the form of a chain with lateral flanges, into the gutter-shaped receiving space of which the billets are placed, whereupon they are conveyed along under the angle-shaped, upwardly and downwardly moving splitting knife 3 and are split by the latter into pieces or chips. A cover plate 4 holds the pieces or chips during the return motion of the knife in their upright position, so that as they travel along further, they will arrive in a guiding trough 5 which leads them to the bundling press.

Figure 4:
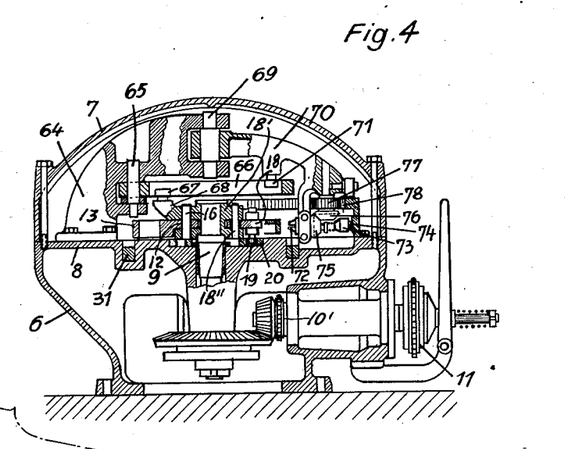
Figure 4A:
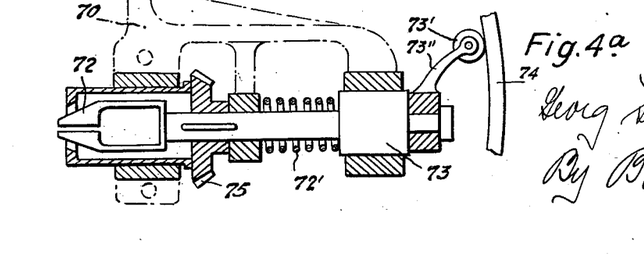
Figures 7, 8:
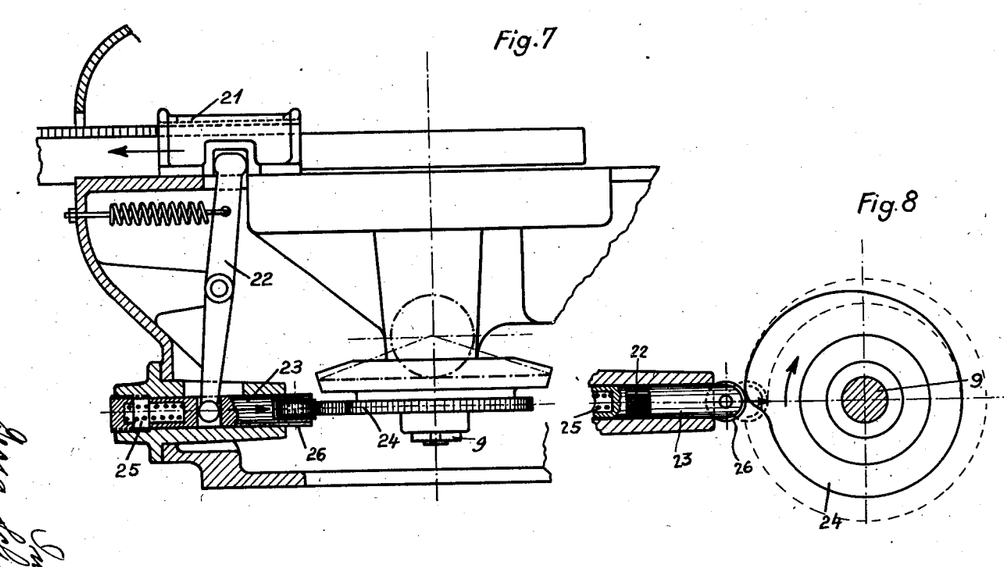
Figs. 7 and 8 are a side view and a view from above partly in section of a guiding carriage for the outlet of the stream of wood, Figs. 9 and 10 a side view and a view from above of a drawing out and gripping device for the binding wire, Figs. 11 and 12 a side view and a view from above of the driving means therefor, Fig. 13 a view from above of the parts during the bundling operation.

The bundling press contains on a substructure 6 under a covering cap 7 a press table 8, in the centre of which a press shaft 9 is rotatably journalled and is driven through gearing 10 by a friction coupling 11 from the common driving motor. On the press shaft 9 is mounted a gripper disc 12 with a semi-cylindrical gripper 13 (Fig. 2) and opposite the latter is a rocking counter gripper device 14 also provided with a semi-cylindrical counter gripper 15, which is so pivoted at 16 that the whole of the counter gripper 14, 15 is capable of rocking about the pivot 16 into the circular path of the gripper 13 towards the press shaft 9. For producing this rocking motion said gripper device 14 is connected to a pivot 18" of a plate 18' fastened to the press shaft 9, by two links 17, 18, the common point of linkage of which is provided at 19 (Fig. 4) with a roller which runs in a cam groove 20 on the press table 8. As will be seen from Figs. 2 and 5 this cam groove 20 is so shaped that the counter gripper 14, 15 when passing the gutter 5 which feeds the stream of wood forward is rocked inwards and can pass the stream of wood unhindered, while immediately afterwards it is swung outwards and when opposite the gripper 13 compresses the quantity of chips taken from the said stream of wood into a round bundle. At the orifice of the wood gutter 5 is a sleeve like sliding member 21 which retains its position shown in Fig. 2 until the gripper 13 has substantially penetrated through the stream of wood, sustained by that wall of the slide 21 which is opposed to the gripper 13 and is then suddenly moved back so far as to allow the gripper with the wood seized by it to pass. For driving the said sliding member 21, the arrangement according to Figs. 7 and 8 is provided, namely a rocking lever 22, which is actuated by a plunger 23 from a cam disc 24 on the press shaft 9. The plunger 23, which is kept pressed by a spring 25 with a roller 26 against the cam disc 24, moves forward slowly during about half the revolution of the press shaft 9, whereupon it is forced back rapidly, a corresponding motion being performed by the sliding member 21.

The disc 12 is cut out so as to allow free movement for the members 17, 18, 19, but without becoming too light on its side opposite to the grippers with respect to the balancing of the inertia forces.

For compressing the bundle thus seized the gripping jaw 15 of the counter gripper device 14, 15 is longitudinally slidable on a plunger 27 (Figs. 13 to 16). This plunger is retracted by a retracting spring 28 and for pushing it forward a pressure imparting lever 29 engages in it, which with a roller 30 runs on an undulating upwardly inclined pressure path 31. This path commences at a point which is so selected that by it the counter gripper 15 immediately after coming in contact with the wood bundle is pressed forward in successive jerks, and ends at a point of the peripheral path lying beyond that at which the bundle is finally tied, where the counter gripper is rocked inwards by the guiding groove 20 referred to above and allows the finished bundle to fall into an opening 32 (Figs. 2 and 3) in the press table 8 for being conveyed away by a roller conveyor 33.

Figure 1:
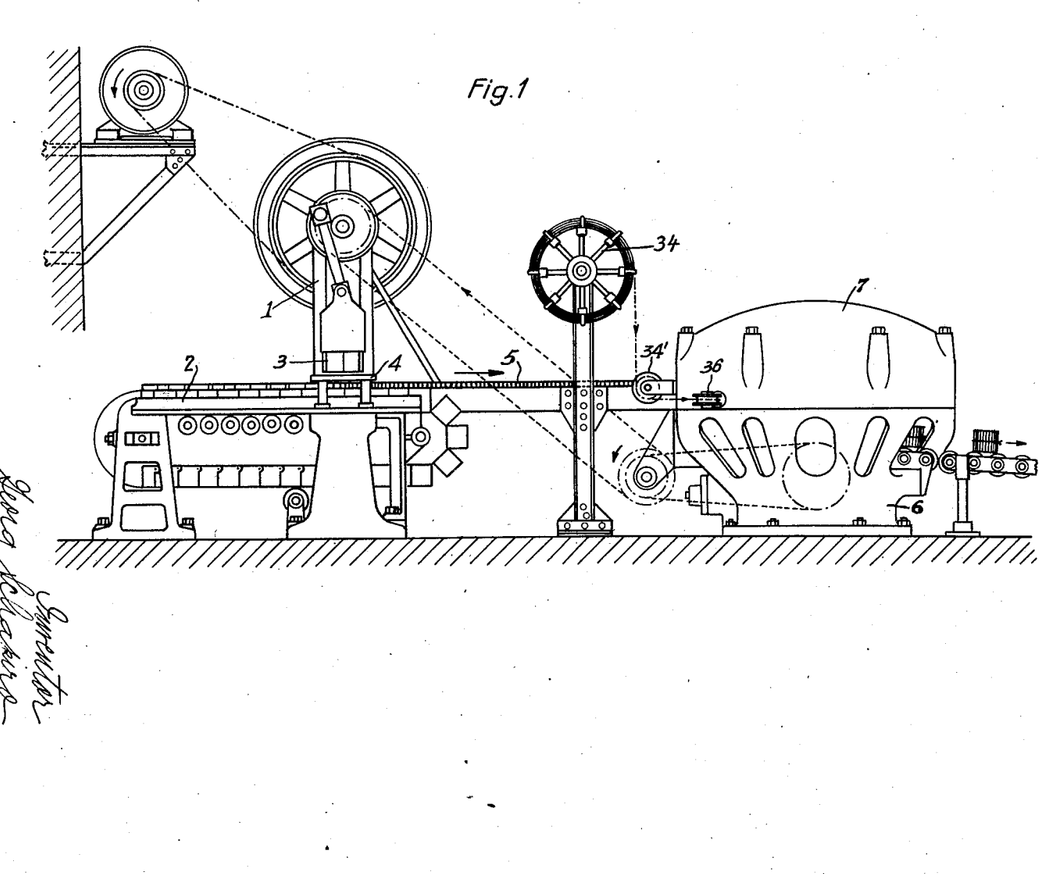
Figure 2:
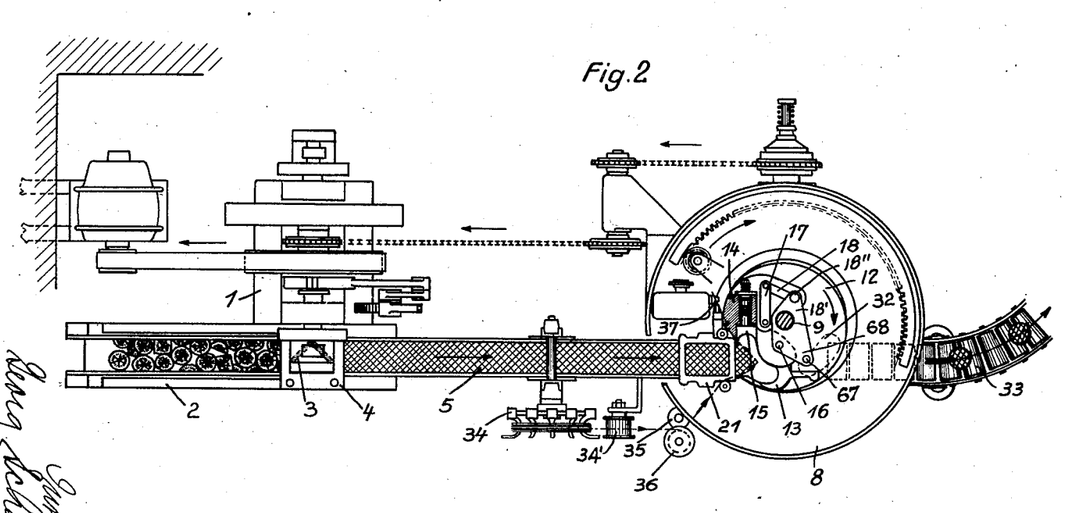
Figures 5, 6, 6A:
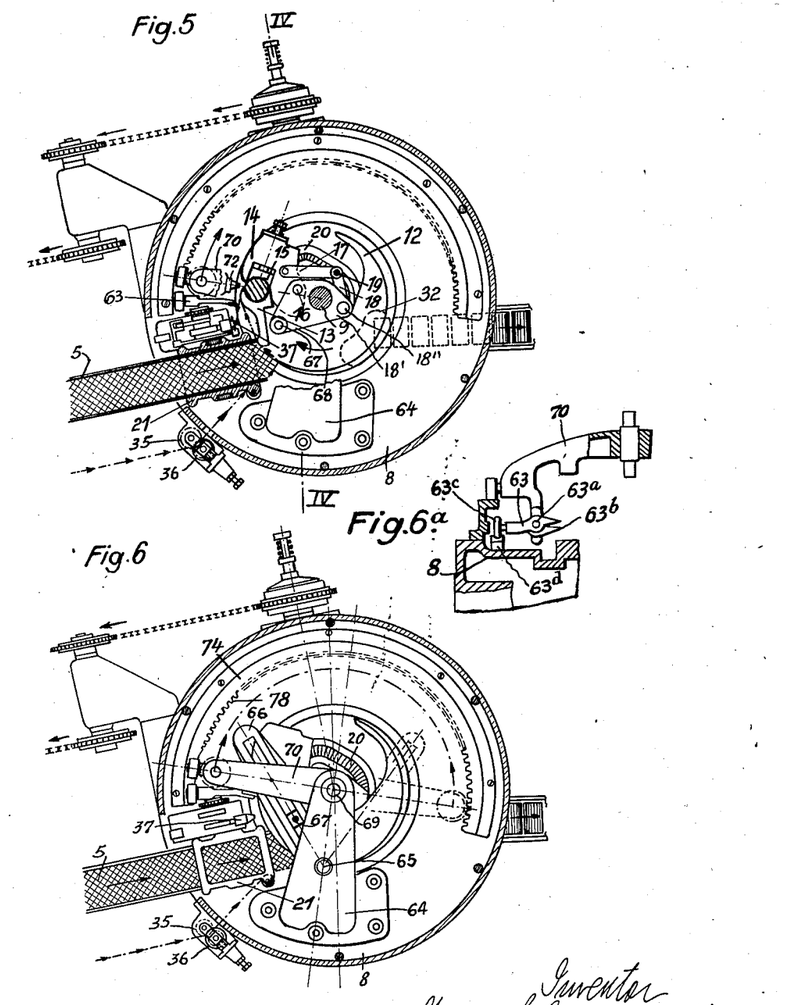
Figure 9:
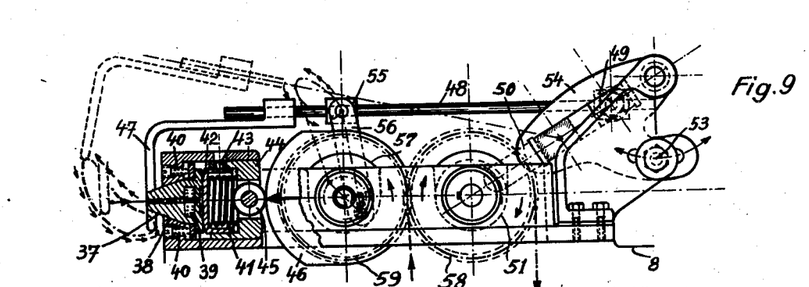
Figure 10:
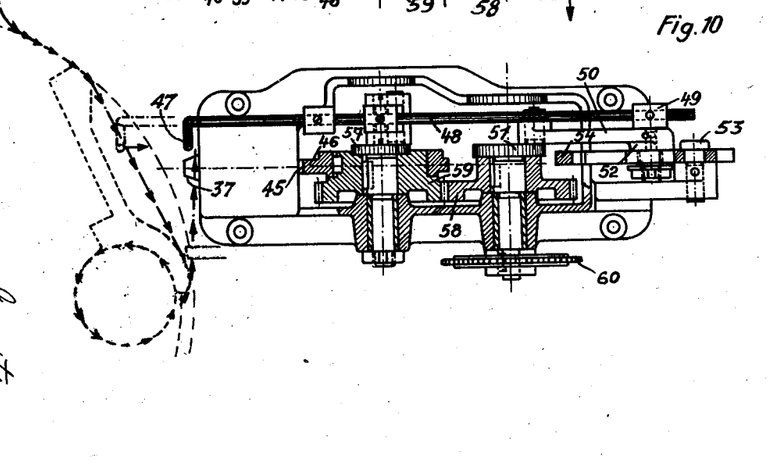
Figure 11:
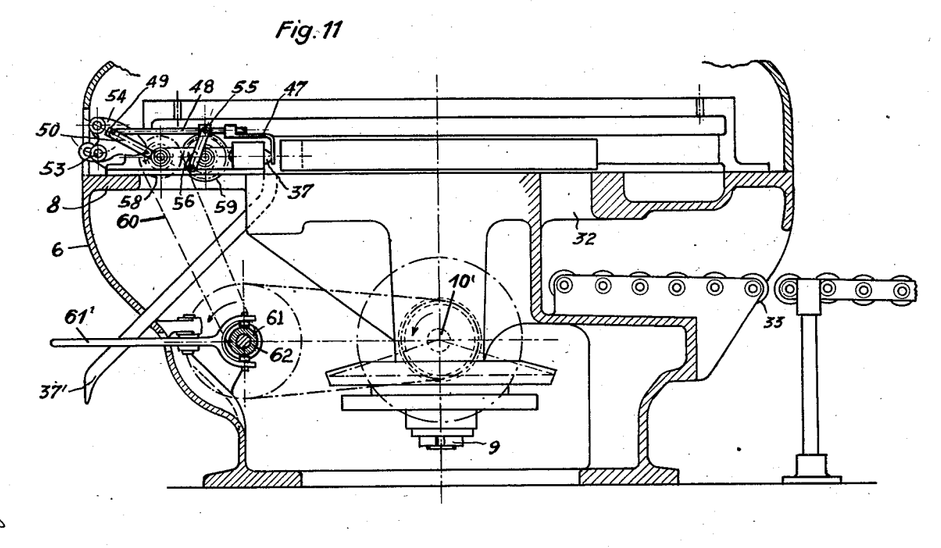
Figure 12:
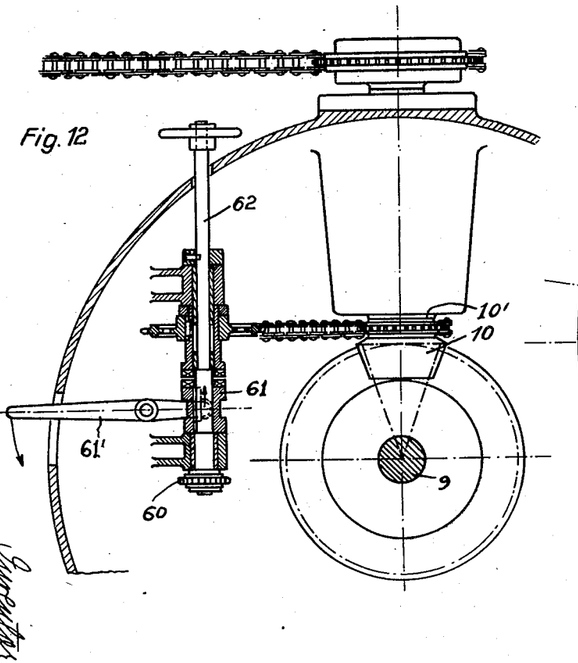
Figure 13:
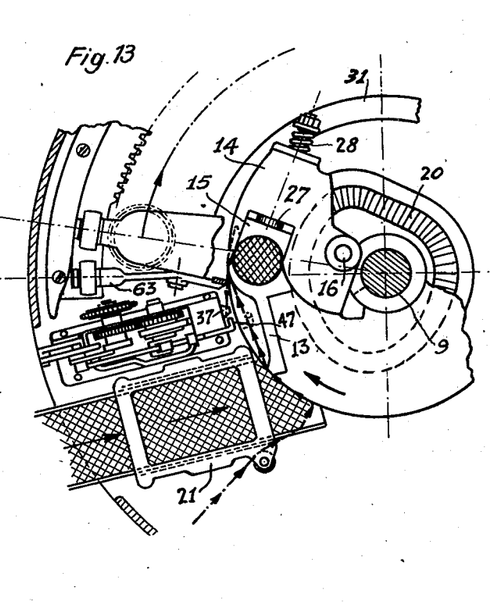
Figures 14, 15, 16:
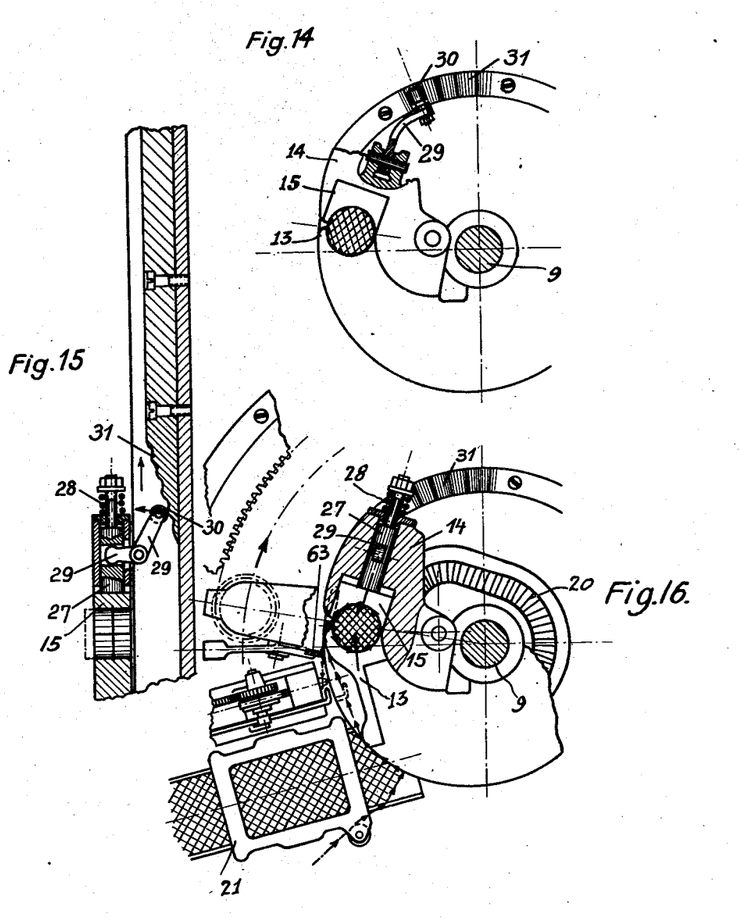
Figs. 14 and 15 are a view from above of and a developed longitudinal section through a pressure adjusting means for the grippers.
Fig. 16 is a view from above of the parts during the bundling operation.

For binding the bundles wire is used which is guided from a reel 34 around a first roller 34' and between a deflecting roller 35 and a roller 36, which is pressed resiliently against it and is braked, with regulated tension past the front of the orifice of the wood gutter 5 to holding tongs 37, so that it yields under tension during the gradual forward motion of the stream of wood as is shown by way of example in Figs. 2, 5 and 6. As soon as the gripper 13 which penetrates through the stream of wood (Fig. 5) has led the bundle of wood, around which the wire is wrapped, past the tongs 37, the gripped wire end must be freed from the tongs and the portion of wire stretched in front of the latter be introduced into it. For these purposes the device shown in Figs. 9–11 is mounted on the press table 8. The tongs 37 are provided with jaws which are longitudinally slidable in a clamping cone 38; said tongs are opened by a splaying spring 39 and are withdrawn by retracting springs 40 for the purpose of opening them. A spring 41 is provided for closing them in a resilient manner, the spring plate 42 of which is slidable up to a stop 43 in a pressure slide 44. A roller 45 of this pressure slide bears against a cam 46, which is driven by the further wire guiding means hereinafter described. A forward motion of the slide 44 thus results in an elastic gripping of the wire in the tongs 37 even when the wire is of non-uniform thickness, while the tongs open during the backward motion, the cam disc 46 being so shaped that it opens the tongs only during the short period when the wire end is released and the portion of wire stretched in front of it in the position shown in Fig. 5, and for the rest leaves them closed. For introducing the part of the wire stretched across it into the tongs, the wire guiding means is provided with a guiding hook 47 which is mounted adjustably on a hook bar 48. This hook bar 48 is disposed at one end adjustably in a pivoted part 49 of a link 50, one end of which is driven by a crank disc 51, while the other end slides in a slotted guide 54, the inclination of which is adjustable by means of clamping screws 53, so that this end of the hook bar 48 travels in a straight line path, the inclination of which is adjustable. The other end of the hook bar 48 is adjustable in a pivoted part 55 of a link 56, which is connected to a second crank disc 57. The two crank discs 51, 57 are connected by toothed wheels 58, 59, of which the latter supports the above-mentioned cam disc 46 of the tongs while the former is connected by a chain drive 60 (Fig. 11) by way of a disconnecting coupling 61 with a handle 61' on an intermediate shaft 62 which is itself driven from the main gearing shaft 10'. By means of this drive the hook bar 48 guides the hook 47 in a curve in such a manner that, with the parts in the positions shown in Fig. 5, it draws the wire which is stretched in front of the tongs into the tongs 37, whereupon the latter close and grip the wire. Thereupon the previously freed wire end and the wire now gripped in the tongs are cut off close to the bundle by shears 63, which may be of any construction and may be operated for instance by the gear shown in Figs. 9–11. In the present case, as seen from Figs. 5, 6 and 6$^a$, the movable shear arm 63 is supported by a pivot 63$a$ on the binding arm 70 of the machine in opposition to a fixed shear blade 63$b$. On its free end, the movable arm 63 is provided with a roller 63$c$, and a cam 63$d$ is fastened on the machine bed 8 in such a way, that in travelling round with the binding arm 70 the roller 63$c$ is engaged by said cam 63$d$ and closes the shears 63, 63$b$ so as to cut off the bundling wire stretched between the grippers 13, 14 and the tongs 37.

Figure 3:
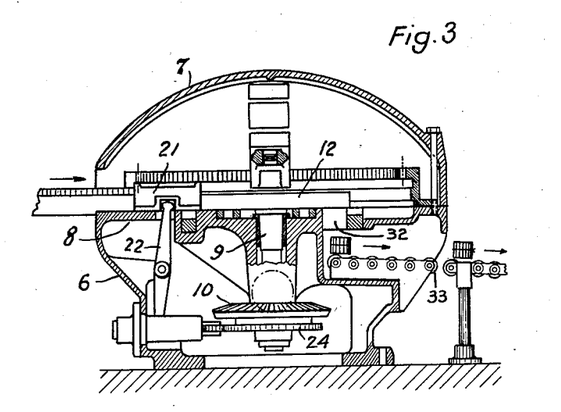

On the bundle, having been thus gripped and recompressed, continuing to travel during the further rotation of the press shaft 9 with the ends of the binding wire extending outwardly, the wire ends come to the binding device, in which they are twisted together. This binding device is arranged so as to revolve coaxially with the press shaft 9 and to return again so as to perform the binding operation while the bundle continues to travel along uninterruptedly, which is illustrated more particularly in Figs. 4, 4$^a$, 5 and 6. A bearing bracket 64 mounted on the press table 8 supports in a bearing 65 a slotted guide 66 in which a sliding block 67 of a driver arm 68 on the press shaft 9 engages, so that the slotted guide performs a slow swinging motion in the direction of the rotary motion of the press shaft, followed by a rapid return motion. As the support of the binding device there rests in a bearing 69 of the bearing bracket 64, which is coaxial with the press shaft 9, a binding arm 70 which engages with a sliding block 71 in the slotted guide 66 and thus, following the movements of the latter, travels along with the wood bundle during the binding operation, after which it returns rapidly. On the binding arm 70 is pivoted a binding tongs arrangement 72 which is constructed in a similar way to the gripper tongs 37, that is to say, with an axially slidable pressure slide 73 for opening and closing them. The pressure applying member of this pressure slide supports a roller 73' by means of the fork 73'' and is rotatable about the axis of rotation of the tongs 72 and the slide 73. This roller 73' travels along a curved path 74 fixed to the press table 8, which causes the binding tongs 72 to be axially moved and thereby to close at the end of this movement during the binding operation, that is, immediately after the forward motion into the position shown in Fig. 5 and for the rest releases the tongs so that they will open under the influence of the opening spring 72'. The binding tongs arrangement 72 is journalled in the sleeve of the hub of a bevel wheel 75 in such a manner that it is compelled to turn with the said wheel, while for the rest it can perform the axial displacement in it required for the closing and opening motion. With the bevel wheel 75 there meshes a bevel wheel 76 which is connected to a spur wheel 77, which latter rolls along a ring of teeth 78 provided on said peripheral circular guide 74 in such a manner that immediately after the closing of the binding tongs arrangement 72 the latter has imparted to it the rotary motion for twisting the wire ends together, which rotary motion continues up to shortly before the reopening of the tongs, whereupon immediately the finished bundle falls out through the table opening 32 (Fig. 3).

The whole operation is thus as follows: The wood blocks are placed on the conveyor 2, are split in the machine 1, 3 and are conveyed directly in the form of an ordered stream of wood in the gutter 5 to the bundling press where they slowly push forward the wire which is stretched tautly across the gutter opening. The counter gripper 15 on being swung inwards travels past this outlet for the stream of wood, while the gripper 13 penetrates into it and thereupon, after the withdrawal of the bundling slide 21, penetrates right through the stream of wood, embracing the divided off quantity with the wire round it. Immediately afterwards the counter gripper 14, 15 is swung outwards, so that it presses the quantity of wood into a round bundle and then further presses it in jerks with the aid of the ascending pressure path 31. At this moment the gripper tongs 37 release the wire end, the hook 47 draws the transversely tensioned wire into the tongs, the latter close, and the two pieces of wire are cut off close to the bundle by the shears 63, the cut off free wire end being conveyed away out of the machine through a guiding tube 37' (Fig. 11). In this state the grippers hold the wire together with the bundle of wood so tightly that the short ends of the wire are close to each other and project from the grippers in this relation and are advanced by rotation of the machine directly into the mouth of the twister. At this moment the binding tongs arrangement 72 is radially displaced inwardly and by closing grips the wire ends sticking out between the grippers travelling along before said tongs, twisting them together while the binding arm 70 travels round with the grippers and then returning rapidly into the initial position, whereupon through the grippers opening the finished bundle is thrown out to the table opening 32.

If the output of the bundling press cannot be brought by a sufficiently rapid revolution up to full agreement with the output of the splitting device the gripper device may if necessary be doubled, so that two or more gripper systems are distributed over the periphery of the gripper tongs, the shears and the binding tongs must run at a correspondingly increased speed.

Figure 17:
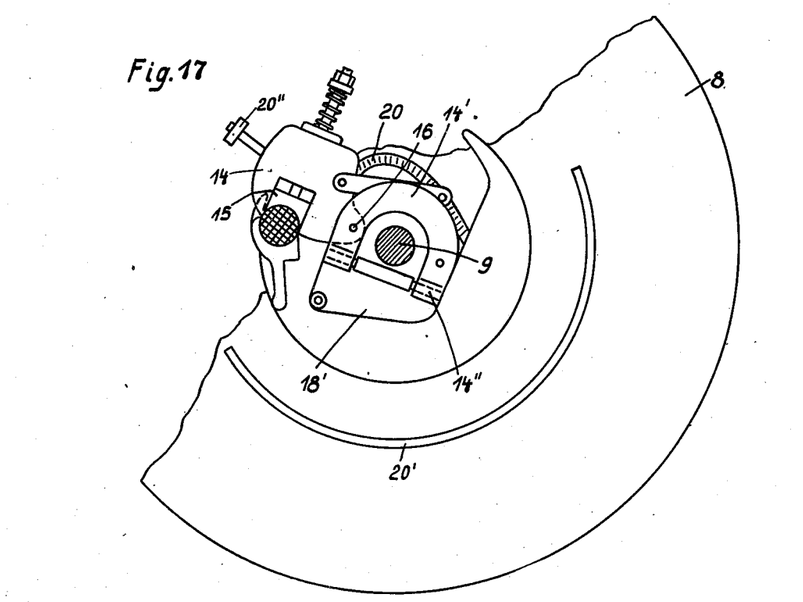
Fig. 17 is a detail elevation partly in section, corresponding to Fig. 5, of a modified form of gripper mechanism.

Modifications are of course possible, more particularly as regards keeping the counter gripper free from the stream of wood, for instance by the counter gripper 14, 15, instead of swinging inwards, being made according to Fig. 17 to swing aside upwards (or downwards) entirely with an intermediate member 14' to which it is linked by its pivot 16, and which is swingable about a pivot 14" arranged on the plate 18' fastened to the press shaft 9. For effecting this upward movement, an ascending cam 20' is arranged on the press table 8, and the counter gripper 14, 15 is provided with a roller 20" which during the rotation of the press shaft 9 comes onto said cam 20' and thereby raises the counter gripper, so that the latter entirely with the levers 17, 18 and the roller 19 is brought out of the path of the wood stream.

Figure 18:
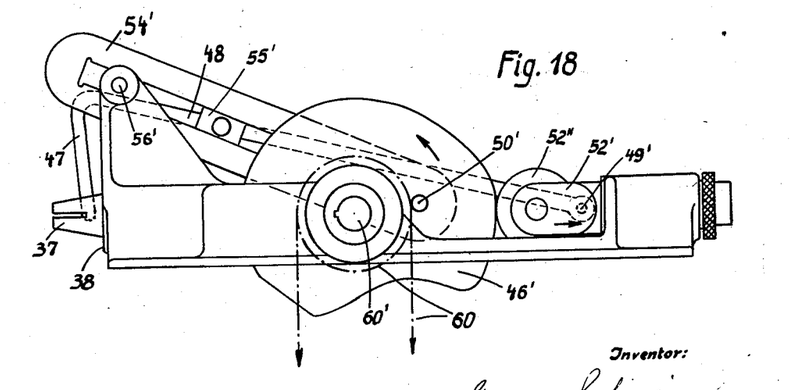
Fig. 18 is a side view of a modification of the gripping device shown in Figs. 9 and 10.

The wire guiding means for introducing the part of the wire, stretched between the stream of wood and the quantity of wood divided off in the gripper, into the tongs may, instead of being constructed in the form shown in Figs. 9 and 10 with two guiding cranks for guiding the guiding hook 47, be provided according to Fig. 18 with cam discs or one cam disc 46' and one guiding crank 50'. In this constructional form the tongs 37, the clamping cone 38 and all appertaining members are precisely the same as described in Figs. 9 and 10, and the same is also true for the hook 47, 48 with the exception that the latter is linked at 49' to a slide 52' fitted with a roller 52". A forward portion of the hook 47, 48 is linked to a slide 55', and this slide glides in a slotted guide 54' which is driven by said crank 50' and guided on a pivot 56' fastened to the frame of the device. As the crank pin 50' is mounted on the cam disc 46', which in its turn is fastened to the shaft 60' supporting the driving chain wheel 60, the single driving shaft 60' pushes the hook bar 48 along by means of the cam disc 46' and by the crank 50' it produces the vertical displacement of the hook bar by means of a slotted guide (or link) 54'.

I claim:

1. A method of producing bundled small wood, comprising splitting a wood billet into pieces, conveying said pieces in the position they occupy during the splitting and in a compact stream to be bundled, dividing off a quantity of said pieces from the foremost part of said stream and binding the divided off quantity into a bundle.

2. A method of producing bundled small wood, as claimed in claim 1, wherein the divided off quantity of the compact stream of wood is compressed and bound while being conveyed forward.

3. A method of producing bundled small wood, as claimed in claim 1, wherein a bundling wire is guided along from a stored quantity round the front portion of the foremost part of the stream of wood to a point where it is arrested, in dividing off the foremost quantity of the compact stream of wood said wire is drawn through between said stream of wood and said divided-off quantity, and wrapped around the latter.

4. A machine for producing bundled small wood, comprising a wood splitting machine, a conveyor adapted to receive blocks of wood and convey them to said splitting machine and to take up the chips in close juxtaposition directly in the position which they occupy during splitting, and a bundling press forming a continuation of said conveyor.

5. A machine for producing bundled small wood, as claimed in claim 4, wherein the conveyor consists of a conveyor chain and of an adjoined transmission gutter ending on the bundling press.

6. A machine for producing bundled small wood, as claimed in claim 4, wherein the bundling press contains means for holding a binding wire extended in front of the compact wood stream coming from the outlet of the conveyor, and a gripper adapted to penetrate through the foremost part of the stream of wood contained in said conveyor and to take along with it said binding wire so as to loop said part of wood.

7. A machine for producing bundled small wood, as claimed in claim 4, wherein the bundling press contains a continuously revolving press shaft, a gripper on said shaft for penetrating through the foremost part of the stream of wood contained in said conveyor, a counter gripper mounted on said shaft so as to be able to assume different radial elongations with respect to said shaft, and means for shifting said counter gripper inward in passing in front of the wood stream, and shifting it outward for enclosing the detached wood in cooperation with said gripper.

8. A machine for producing bundled small wood, as claimed in claim 4, wherein the bundling press contains a continuously revolving press shaft, a gripper on said shaft for penetrating through the foremost part of the stream of wood contained in said conveyor, a counter gripper mounted on said shaft so as to be able to assume different radial elongations with respect to said shaft, means for shifting said counter gripper inward in passing in front of the wood stream, and shifting it outward for enclosing the detached wood in cooperation with said gripper, a tangentially movable jaw in said counter gripper, and means for pressing said jaw against the wood enclosed between said grippers.

9. A machine for producing bundled small wood, as claimed in claim 4, wherein the bundling press contains a continuously revolving press shaft, a gripper on said shaft for penetrating through the foremost part of the stream of wood contained in said conveyor, a counter gripper mounted on said shaft so as to be able to assume different radial elongations with respect to said shaft, means for shifting said contour gripper inward in passing in front of the wood stream, and shifting it outward for enclosing the detached wood in cooperation with said gripper, a tangentially movable jaw in said counter gripper, and means for exerting a succession of separate pressure impulses on said jaw in the direction against the wood enclosed between said grippers.

10. A machine for producing bundled small wood, as claimed in claim 4, wherein the bundling press contains a continuously revolving press shaft, a gripper on said shaft for penetrating through the foremost part of the stream of wood contained in said conveyor, a counter gripper mounted on said shaft so as to be able to assume different radial elongations with respect to said shaft, means for shifting said counter gripper inward in passing in front of the wood stream, and shifting it outward for enclosing the detached wood in cooperation with said gripper, a tangentially movable jaw in said counter gripper, and a stepped cam for exerting a succession of separate pressure impulses on said jaw in the direction against the wood enclosed between said grippers.

11. A machine for producing bundled small wood, comprising a wood splitting machine, a wood conveyor taking the split wood and a bundling press fed by said conveyor, said bundling press containing a travelling gripper adapted to penetrate through the foremost part of the wood contained in said conveyor, means for feeding a bundling wire to said gripper so as to be caught by the latter on its entrance into the wood, a pair of tongs for holding the end of said bundling wire, and means for opening said tongs for the release of the wire end and for the introduction of a further wire part, said tongs being arranged in such a manner next to the path of the gripper that the part of the wire pulled along by said gripper is tensioned transversely in front of said tongs.

12. A machine for producing bundled small wood, as claimed in claim 11, wherein a wire guiding member is provided and operated so as to draw the tensioned wire into the tongs.

13. A machine for producing bundled small wood, as claimed in claim 11, wherein a hook shaped wire guiding member is provided for drawing the tensioned wire into the tongs, and for driving said member first vertically and then horizontally towards the tongs, two driving means, such as cranks, being provided each of which drives said guiding member in one of said directions.

14. A machine for producing bundled small wood, as claimed in claim 11, wherein a hook shaped guiding member is provided for drawing the tensioned wire into the tongs, and for driving said member first vertically and then horizontally towards the tongs said member being guided on one end in a longitudinal guide and driven by a crank.

15. A machine for producing bundled small wood, as claimed in claim 11, wherein a wire guiding member is provided and operated by a driving device containing adjustable means so as to draw the tensioned wire into the tongs.

16. A machine for producing bundled small wood, comprising a wood splitting machine, a wood conveyor adapted to receive blocks of wood and convey them to said splitting machine and to take up the chips in close juxtaposition directly in the position which they occupy during splitting, and a bundling press forming a continuation of said conveyor, said bundling press containing a continuously revolving press shaft, a gripper rotating with said shaft, for penetrating through the foremost part of the stream of wood contained in said conveyor, a counter gripper mounted on said shaft for enclosing the detached wood in cooperation with said gripper, means for wrapping a bundling wire round the wood enclosed between said grippers, a pair of binding tongs with closing and rotating means, a guiding arm for said binding tongs, swingable coaxially to said press shaft, and means operatively connected to said shaft for swinging said arm to and fro.

17. A machine for producing bundled small wood, as claimed in claim 16, wherein, a toothed rack is provided on said press, and a toothed wheel is provided on said binding tongs for rolling along said rack and driving said tongs so as to effect the twisting of the wire ends in travelling.

18. A machine for producing bundled small wood, as claimed in claim 16, wherein a cam surface is provided on said press for pushing forward and closing the jaws of said binding tongs for gripping the wire ends.

GEORG SCHAPIRO.